United States Patent [19]

Kumamoto et al.

[11] Patent Number: 4,750,104
[45] Date of Patent: Jun. 7, 1988

[54] METHOD OF AND APPARATUS FOR TRACKING POSITION ERROR CONTROL

[75] Inventors: Satoshi Kumamoto; Hirofumi Katsumata; Hideo Fujie, all of Numazu, Japan

[73] Assignee: Toshiba Kikai Kabushiki Kaisha, Tokyo, Japan

[21] Appl. No.: 841,321

[22] Filed: Mar. 19, 1986

[30] Foreign Application Priority Data

Mar. 20, 1985 [JP] Japan .................................. 60-57297

[51] Int. Cl.⁴ ...................... G05B 11/01; G05B 13/02
[52] U.S. Cl. ..................................... 364/167; 318/603; 318/632; 364/174; 364/176; 364/183; 364/474
[58] Field of Search ................................ 364/167-171, 364/176, 177, 174, 183, 474, 475; 318/611, 615-618, 601, 603, 604, 628, 561, 632

[56] References Cited

U.S. PATENT DOCUMENTS

| | | | |
|---|---|---|---|
| 3,793,511 | 2/1974 | Bala et al. .................. | 364/183 X |
| 4,052,642 | 10/1977 | Speth et al. .................. | 364/177 X |
| 4,099,113 | 7/1978 | Hayashi .................. | 364/183 X |
| 4,195,337 | 3/1980 | Bertrano et al. .................. | 364/177 X |
| 4,338,659 | 7/1982 | Kurakake .................. | 364/176 X |
| 4,549,261 | 10/1985 | Mouhamed .................. | 364/183 |
| 4,604,681 | 8/1986 | Sakashita .................. | 364/177 |

*Primary Examiner*—Joseph Ruggiero
*Attorney, Agent, or Firm*—Cushman, Darby & Cushman

[57] ABSTRACT

There are disclosed a method of and an apparatus for controlling a track position error of a load such as the workpiece table of a multi-axis machine tool. A feed pulse signal for driving the load is added to a deviation of a present position signal detected of the load from a commanded position signal dependent on the polarity of the deviation. The deviation of the added feed pulse signal from the present position signal of the load is determined, and a drive signal for driving the load is derived from a deviation signal indicative of the last-mentioned deviation. A drive source for driving the load is controlled with the deviation signal.

6 Claims, 1 Drawing Sheet

METHOD OF AND APPARATUS FOR TRACKING POSITION ERROR CONTROL

BACKGROUND OF THE INVENTION

The present invention relates to a method of and an apparatus for tracking position error control in a closed-loop servo system, and more particularly to a method of and an apparatus for controlling a tracking position error so as to be of a desired value in a positioning servo system for a machine tool or the like.

Prior positioning servo systems for use with machine tools or the like control the position of an object, such as a workpiece table, with the difference between feed command pulses and position feedback pulses which is applied as an actual speed command. The track acutally followed by the object is delayed at all times with respect to the actually commanded position, the delay varying dependent on the commanded feed speed and the gain of the closed servo loop.

Ordinary digital servo systems comprise a differential counter for counting feed command pulses and position feedback pulses and issuing the difference as an output signal indicating a speed command, and a D/A converter for converting the output signal from the differential counter to an analog signal. The output signal of the differential counter is representative of the delay of the load shaft position from the commanded position, and depends on the commanded feed speed and the closed-loop gain.

When a workpiece is to be machined along a given path by controlling two or more axes in a machine tool, the contour to which the workpiece is machined is subjected to an error if the gains of the closed servo loops for the respective axes about which the workpiece is displaced are different from each other. To avoid this drawback, the controls for conventional machine tools have adjustable axis loop gains for achieving a desired degree of machining accuracy. However, when any contouring error is to remain in the range of submicrons, the desired machining accuracy could not be accomplished only by adjusting the loop gains for the respective axes. Particularly, it has been found in ultra-precision machine tools that the contouring error is produced by different delays caused with respect to the respective axes when the loop gains in the control servo system are different from axis to axis even if the same command speed is given to the axes.

SUMMARY OF THE INVENTION

It is an object of the present invention to provide a track position error control method for a servo system employing a plurality of axes with different loop gains, the method being capable of controlling the track error for each axis so as to fall within a predetermined range, preferably zero, so that any contouring error of a machine tool which would result from the different loop gains can be eliminated.

Another object of the present invention is to provide a method of controlling a track position error of a load, comprising the steps of adding a feed pulse signal for driving the load to a deviation of a present position signal detected of the load from a commanded position signal dependent on the polarity of the deviation, determining a deviation of the added feed pulse signal from the present position signal of the load, deriving a drive signal for driving the load from a deviation signal indicative of the last-mentioned deviation, and controlling a drive source for driving the load with the deviation signal.

Still another object of the present invention is to provide an apparatus for controlling a track position error of a load, comprising a feed pulse generator for generating feed pulses to drive the load, a feedback pulse generator for generating feedback pulses indicative of a substantial driven condition of the load, a deviation detector for detecting a deviation of the feedback pulses from the feed pulses, a first D/A converter for converting a digital signal produced as a deviation signal from the deviation detector to an analog signal, a command position counter for counting the feed pulses from the feed pulse generator, a load position counter for counting the feedback pulse generator, a processor for computing a digital signal indicative of the difference between an output signal from the command position counter and an output signal from the load position counter, a second D/A converter for converting the digital signal from the processor to an analog signal, and means for controlling the load with the analog signals produced from the first and second D/A converters.

A still further object of the present invention is to provide an apparatus for controlling a track position error of a load, comprising corrective-pulse generator means for generating pulses of a frequency corresponding to the difference between the count of a command position counter for counting feed pulses and the count of a load position counter for counting feedback pulses corresponding to the speed of movement of the load, and for generating a polarity signal representing the polarity of the difference, an adder for selectively increasing and reducing the feed pulses with the pulses produced from the corrective-pulse generator means dependent on the polarity, and means for driving the load according to the difference between a count of output pulses from the adder and a count of the feedback pulses.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
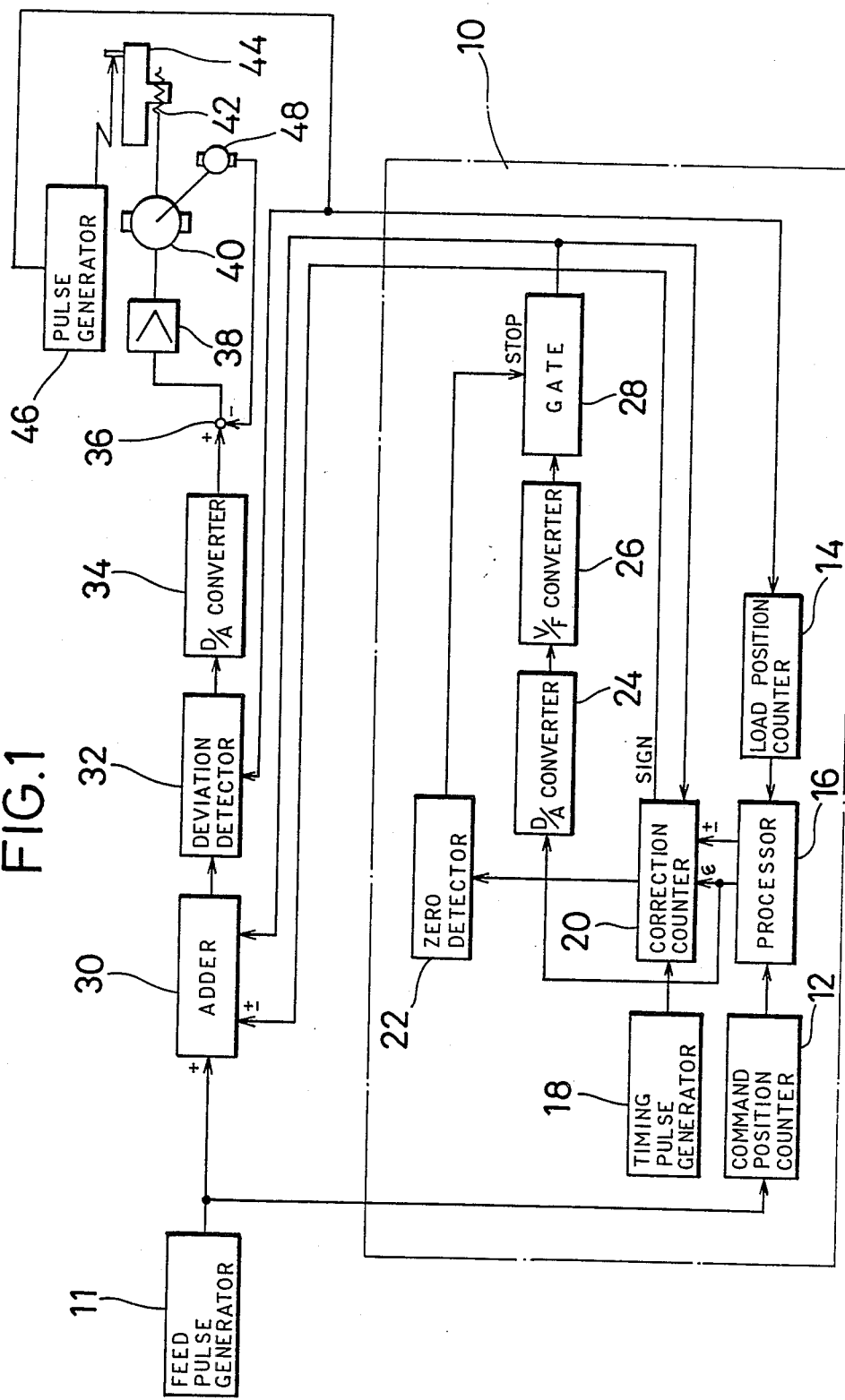
FIG. 1 a block diagram of an apparatus employed to carry out a method of controlling a track position error according to the present invention.

As shown in FIG. 1, an apparatus or electric circuit for carrying out a track position error control method according to the present invention comprises a corrective-pulse generator 10 including a command position counter 12 for counting speed command pulses, i.e., feed pulses produced from a feed pulse generator 11, a load position counter 14 for counting position feedback pulses, and a processor 16 for computing the difference between the counts from the command position counter 12 and the load position counter 14. The output terminal of the processor 16 is connected to a correction counter 20 in which the output signal from the processor 16 is preset in response to a timing pulse supplied as a load pulse from a timing pulse generator 18. The correction counter 20 has an output terminal coupled to a zero detector 22 which detects when the count from the correction counter 20 falls to zero. The correction counter 20 also has another output terminal connected to an input terminal of an adder 30 (described later). The output terminal of the processor 16 is also connected to a D/A converter 24 which converts the output signal from the processor 16 to an analog voltage. The D/A converter 24 has its output terminal joined to a V/F converter 26 for converting the analog voltage from the D/A converter 24 to a corresponding frequency. The output terminal of the V/F converter 26 is coupled to a gate circuit 28 which is closed in response to the output signal from the zero detector 22. The output signal from the gate circuit 28 is supplied to the correction counter 20 and also to the adder 30. The adder 30 has another input terminal supplied with the feed pulses from the feed pulse generator 11.

The output terminal of the adder 30 is connected to an input terminal of a deviation detector 32, with its other input terminal supplied with the position feedback pulses that are also fed to the load position counter 14. The output terminal of the deviation detector 32 is connected to a D/A converter 34 having its output terminal coupled to an analog subtracter 36. The analog subtracter 36 has its output terminal connected to an amplifier 38 with its output terminal coupled to a motor 40. The rotatable drive axis of the motor 40 is mechanically coupled to a feed screw 42 held in threaded engagement with a workpiece table 44. The workpiece table 44 engages a pulse generator 46 comprising a rotary encoder, a linear position detector, or the like. The output signal from the pulse. generator 46 is applied as the feed pulses to the deviation detector 32 and the load position counter 14, as described above. To the motor 40, there is coaxially connected a tachogenerator 48 with its output terminal connected to another input terminal of the analog subtracter 36.

Operation of the electric circuit for effecting the track position error control method of the invention is as follows:

Feed pulses serving as a speed command to move the workpiece table 44 are supplied from the feed pulse generator 11 to the adder 30 and the command position counter 12. The command position counter 12 counts the supplied feed pulses, i.e., speed command pulses. The pulse generator 46 detects, as a pulse train, the displacement of the workpiece table 44 caused by the feed pulses and supplies such a pulse train of position feedback pulses to the load position counter 14. The load position counter 14 counts the supplied position feedback pulses. The count of the command position counter 12 is of a value corresponding to the commanded position for the workpiece table 44. The count of the load position counter 14 is of a value corresponding to the actual displacement of the workpiece table 44. The difference $\epsilon$ between the count from the command position counter 12 and the count from the load position counter 14 is computed by the processor 16. The output signal $\epsilon$ from the processor 16 is preset in the correction counter 20 in response to a timing pulse generated and applied by the timing pulse generator 18 as a load signal to the correction counter 20. The processor 16 also applies a signal indicative of the polarity of the differential signal $\epsilon$ as well as the differential signal itself to the correction counter 20. The difference $\epsilon$ computed by the processor 16 is converted by the D/A converter 24 to a corresponding analog voltage, which is in turn converterd by the V/F converter 26 to a corresponding frequency. Therefore, the frequency of output pulses from the V/F converter 26 is commensurate with the computed difference $\epsilon$ from the processor 16.

When the computed difference $\epsilon$ from the processor 16 is not zero, the gate circuit 28 is open by the output signal fed from the correction counter 20 via the zero detector 22. Therefore, the output signal from the V/F converter 26 is introduced to the adder 30 through the gate circuit 28. The output signal from the V/F converter 26 is also supplied as corrective pulses via the gate circuit 28 to the correction counter 20 to increase or reduce the count of the correction counter 20 to zero. Specifically, each time a corrective pulse from the V/F converter 26 is applied, the count of the correction counter 20 is incremented or decremented by 1 until the count of the correction counter 20 falls to zero. Consequently, the corrective-pulse generator 10 produces a number of corrective pulses corresponding to the difference between the commanded position and the actual load position, i.e., the accumulated value representing the displacement of the workpiece table 44.

The corrective pulses generated by the corrective-pulse generator 10 are applied to the adder 30, which is also fed with the polarity sign signal from the correction counter 20 in the corrective-pulse generator 10. The adder 30 adds the supplied corrective pulses to or subtracts them from the feed pulses from the feed pulse generator 11 dependent on the sign of the polarity sign signal supplied from the correction counter 20. As a result, the corrected output speed command signals from the adder 30 comprises a train of pulses produced by adding the corrective pulses or subtracting them from the original speed command pulses supplied by the feed pulse generator 11 dependent on the polarity sign from the correction counter 20.

The corrected feed pulses from the adder 30 and the position feedback pulses from the pulse generator 46 are supplied to the deviation detector 32 which then detects the deviation between the supplied pulse signals. The deviation data thus detected by the deviation detector 32 is temporarily latched therein and then converted by the D/A converter 34 to a corresponding analog voltage which is amplified by the amplifier 38. The amplified analog voltage from the amplifier 38 is applied to the motor 40 to drive same. The motor 40 rotates the feed screw 42 to move the workpiece table 44, the displacemnt of which is detected by the pulse generator 46. The rotational speed of the motor 40 is detected by the tachogenerator 48 coupled to the motor 40. The output signal from the tachogenerator 48 is fed back to the analog subtracter 36, so that the position of the workpiece table 44 can also be controlled by this minor feedback loop.

As described above, a number of feedback pulses corresponding to the displacement or speed of movement of the workpiece table 44 are generated by the pulse generator 46, and the count of the load position counter 14 which counts the feedback pulses is commensurate with the load position, i.e., the workpiece table position.

The feedback loop following the deviation detector 32 is of conventional nature. However, the feed pulses applied to the deviation detector 32 are corrected by the corrective pulses according to the present invention. More specifically, the commanded speed is controlled by the positional error between the commanded position and the actual load position so that the deviation of the actual load position from at least the commanded position will be equal to "zero" at all times. Therefore, the commanded speed is equivalently varied by the difference between the commanded position and the actual load position, and the delay of the present load position from the commanded position can be controlled so as to be "zero" at all times. Since the delay can be eliminated for each axis, the contouring accuracy of a multi-axis machine tool can be increased without requiring precise adjustment of the loop gains of the respective servo systems with respect to each other.

In the illustrated embodiment, the output signal from the processor 16 is applied to the D/A converter 24, the output voltage signal of which is converted by the V/F converter 26 to the corresponding frequency, and the frequency signal from the V/F converter 26 is fed via the adder 30 and the deviation detector 32 to the D/A converter 34. However, the output signal from the D/A converter 24 may be applied directly to the analog subtracter 36 connected to the output terminal of the D/A converter 34. This can simplify the circuit arrangement, so that the apparatus can be manufactured less costly.

With the present invention, as described above, the feed pulses are corrected by the positional error between the commanded position and the actual load position, and the displacement of the load is controlled by the corrected feed pulses. As a consequence, the contouring accuracy of a multi-axis machine tool is improved by the servo system of the present invention, which can be employed for machining operations requiring a high degree of accuracy in the range of submicrons. Specifically, the contouring accuracy of a machine tool with two or more axes can be increased without necessitating a complex adjustment process for bringing the loop gains of the respective axes into conformity with each other.

The apparatus of the present invention is illustrated as being implemented by individual hardware components. However, the illustrated hardware mechanism may partly or entirely be replaced with a system including a computer, and the respective component functions may be performed on a time-division multiplexing basis.

Although a certain preferred embodiment has been shown and described, it should be understood that many changes and modifications may be made therein without departing from the scope of the appended claims.

What is claimed is:

1. A method of controlling a track position error of a load, comprising the steps of:
    adding a feed pulse signal for driving said load to a deviation of a present position signal detected of said load from a commanded position signal dependent on the polarity of said deviation;
    determining a first deviation of the feed pulse signal from the present position signal of said load;
    deriving a drive signal for driving said load from a deviation signal indicative of said last-mentioned deviation;
    controlling a drive source for driving said load with said deviation signal;
    determining a second diviation between said drive signal for driving said load and a feedback signal produced by said drive source; and
    driving said drive source substantially with a signal representative of said second deviation.

2. An apparatus for controlling a track position error of a load, comprising:
    a feed pulse generator for generating feed pulses to drive said load;
    a feedback pulse generator for generating feedback pulses indicative of a substantial driven condition of said load;
    a deviation detector for detecting a deviation of said feedback pulses from said feed pulses;
    a first D/A converter for converting a digital signal produced as a deviation signal from said deviation detector to an analog signal;
    a command position counter for counting the feed pulses from said feed pulse generator;
    a load position counter for counting the feedback pulse generator;
    a processor for computing a digital signal indicative of the difference between an output signal from said command position counter and an output signal from said load position counter;
    a second D/A converter for converting the digital signal from said processor to an analog signal; and
    means for controlling said load with said analog signals produced from said first and second D/A converters.

3. An apparatus for controlling a track position error of a load, comprising:
    corrective-pulse generator means for generating pulses of a frequency corresponding to the difference between the count of a command position counter for counting feed pulses and the count of a load position counter for counting feedback pulses corresponding to the speed of movement of said load, and for generating a polarity signal representing the polarity of said difference;
    an adder for selectively increasing and reducing said feed pulses with the pulses produced from said corrective-pulse generator means dependent on said polarity; and
    means for driving said load according to the difference between a count of output pulses from said adder and a count of the feedback pulses.

4. An apparatus according to claim 3, wherein said corrective-pulse generator means comprises a processor for computing the difference between the counts from said command position and said load position counter, a correction counter connected to an output terminal of said processor, a D/A converter connected to the output terminal of said processor, a V/F conveter connected to an output terminal of said D/A converter, a gate circuit connected to an output terminal of said V/F converter, and a zero detector connected to an output terminal of said correction counter for controlling said gate circuit, the arrangement being such that, when said gate circuit is closed by said zero detector, an output signal from said V/F converter is applied to said adder for selectively increasing and reducing the feed pulses and also to said correction counter as clock pulses for selectively increasing and reducing the count of said correction counter to zero.

5. An apparatus according to claim 4, further comprising a deviation detector connected to an output terminal of said adder for detecting a deviation between the feed pulses corrected by said adder and said feedback pulses, and a D/A converter for producing an analog drive signal for driving said load in response to a digital output signal from said deviation detector.

6. An apparatus according to claim 5, further comprising a drive source responsive to said drive signal for driving said load, said drive source including load displacement detector means for producing an output signal representing a displacement of said load, and an analog subtracter for generating a deviation signal indicating the deviation between said output signal from said load displacement detector means and said analog drive signal supplied from said last-mentioned D/A converter.

* * * * *